Sept. 6, 1955 J. R. MILES 2,716,918
SLIDE VIEWER
Original Filed Aug. 25, 1950
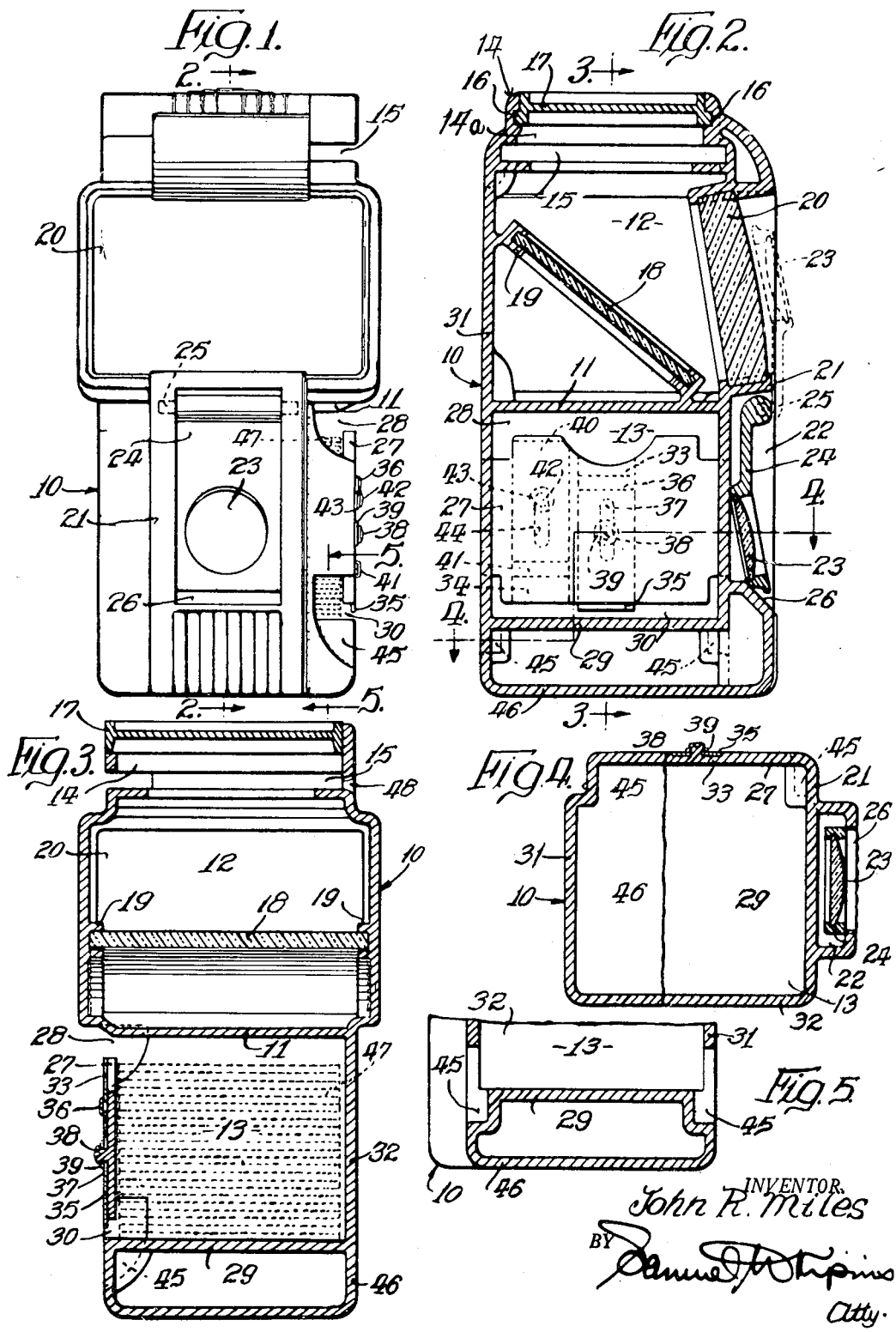
INVENTOR.
John R. Miles

United States Patent Office 2,716,918
Patented Sept. 6, 1955

2,716,918

SLIDE VIEWER

John R. Miles, Chicago, Ill., assignor to
Michael S. Wolk, Chicago, Ill.

Original application August 25, 1950, Serial No. 181,553, now Patent No. 2,621,993, dated December 16, 1952. Divided and this application October 23, 1952, Serial No. 317,257

3 Claims. (Cl. 88—1)

My invention relates to improvements in film slide viewers, and more particularly to a novel film slide frame construction for use with film slide viewers.

It is a principal object of my invention to provide a film slide viewer which is simple to operate and highly efficient, and which enables the same device to be used for viewing both slides and strip film.

Another object of my invention is to provide a compact, inexpensive combination film slide viewer and film slide dispenser.

These and other objects of my invention are achieved by my new film slide viewer, in which the slide dispensing magazine comprises a box-shaped compartment in the lower portion of the viewer, which compartment includes a top, floor therein on which the slides are stacked, and a gate across one side of the compartment, the gate being spaced below the top to form therewith an upper opening through which slides may be inserted into the compartment, the gate further being spaced above the floor to form therewith a lower opening through which slides may be removed, together with means for closing off the said upper opening and means for varying the effective height of the lower opening both to accommodate slides of different thicknesses and to close off the lower opening. The viewer provides also means to facilitate gripping the lowermost slide, by grasping two corners thereof, to assist in its removal through the lower opening in the compartment; and similar means at the upper opening in the compartment and at the slide guiding member of the viewer itself.

By placing the slides to be viewed one at a time in the compartment, through the upper opening, it is apparent that the slides can be removed in a predetermined order from the lower opening in the compartment for placement in the film slide viewer for examination and viewing.

In preferred embodiments of my invention, the film slide viewer includes an inclined mirror above the dispenser compartment, a top opening in the viewer directly over the inclined mirror, and means for positioning (inserting and removing) a film slide, held at two corners thereof in the viewer between the top opening and said mirror. It also includes a magnifying lens positioned in the wall in front of the mirror, to magnify the projected image of the film slide on said mirror. Advantageously, an auxiliary magnifying or correcting lens may be hinged to the aforesaid wall of the film slide viewer, for movement to overlie at least a portion of the magnifying lens in said wall, for close examination of the film slides.

This application is a division of my application Serial No. 181,553 filed August 25, 1950 and issued as Patent Number 2,621,993 on December 16, 1952.

In order that my invention may be more fully disclosed, reference is had to the accompanying drawing which illustrates one form of apparatus embodying the foregoing and such other principles, advantages or capabilities as may be pointed out as this description proceeds, or as are inherent in the present invention. For purposes of clarity in exposition, the following description is explicit, and the accompanying drawing is detailed, but it is distinctly to be understood that said exposition is illustrative only, and that my invention is not restricted to the particular details recited in the specification or shown in the drawing.

In the drawing:

Figure 1 is a front view of a preferred embodiment of my new film slide viewer;

Figure 2 is a left side view taken in section on the line 2—2 of Figure 1;

Figure 3 is a rear view taken in section on the line 3—3 of Figure 2;

Figure 4 is a plan view taken in section on the line 4—4 of Figure 2; and

Figure 5 is a fragmentary right side view taken in section on the line 5—5 of Figure 1.

Like reference characters designate like parts in the drawing and in the description of my film slide viewer which follows.

Referring now to the drawing, and more particularly to Figure 2 thereof, my new film slide viewer is shown as comprising a housing 10 which is subdivided by the partition 11 into an upper film viewer portion 12 and a lower film storage and dispenser portion 13. The film viewer portion 12 includes an upper guide or frame member 14 within which is formed an intermediate channelway or slotted opening 15 adapted to receive and align a picture slide beneath the frame opening 14a. As clearly shown in Figures 1 and 3 the slot openings or channelways 15 and 16 extend across the front and back walls of said frame member 14. The fore portion of these walls is undercut, thereby facilitating insertion and removal of a slide held at two corners thereof. The guide member or frame 14 also includes a pair of interior grooves 16, 16 at an upper level in which the cover or diffusion plate 17 (Figures 2 and 3) is slidable. The cover 17 preferably is quite translucent, to allow a substantial portion of exterior light source to impinge upon a film slide inserted in the slotted opening 15 and to project its picture image upon the inclined mirror 18. In addition, the cover 17 acts as a dust cover, to prevent the entry of dirt and other foreign objects into the interior of the film viewer portion 12.

A narrow slit 48 is formed in the side wall of frame 14 opposite the opening 15 (Figure 3) so that strip film may be threaded through the viewer below the cover 17 for purposes of editing.

A reflecting mirror 18 is held in an inclined position in the film viewer portion 12 by the frame ribs 19. A plano-convex lens 20 is positioned in the front wall 21 in front of the mirror 18, and acts to magnify the projected image of the film slide on the mirror 18. As shown in Figure 2, the lens 20 is inclined from the vertical approximately 10 degrees, for a purpose to be described presently. The front wall 21 immediately below the lens 20 contains a recess 22, in which an auxiliary magnifying lens 23 and its holder 24 are hingedly mounted on a pin 25. The recess 22 contains a finger groove 26 to facilitate swinging the holder 24 upwardly on the pin 25 to position the lens 23 in the manner shown in dotted outline in Figure 2.

Referring now more particularly to Figures 2 and 3, a gate 27 extends across the right side of the housing 10, as viewed in Figure 1, the gate 27 being spaced below the partition 11 to form an upper opening 28. In addition the gate 27 is spaced from the floor, or false bottom 29 to form a lower opening 30 in the housing. The front wall 21, the rear wall 31 and the side wall 32 opposite the gate 27, are all closed, so that the film storage and dispenser portion 13 is essentially a box-shaped container having an upper opening 28 and a lower opening 30 therein.

The gate 27 is provided with two vertically disposed grooves 33 and 34. A finger tab 35 having a protuberance 36 thereon is slidable in the groove 33. The finger tab 35 further includes a closed slot 37 which is substantially parallel to the groove 33, and through which the stud 38 on the gate 27 projects. A washer 39 is interposed between the stud 38 and the finger tab 35, and is held in place by thermally heading over said stud 38. By means of the protuberance 36, the tab 35 may be shifted up or down along the groove 33, to bridge the lower opening 30 in varying degrees, for a purpose which will be explained presently. Similarly, a finger tab 40 having a protuberance 41 thereon is slidable in the groove 34, and is held in position by the headed over stud 42 and the washer 43 which mates with the closed slot 44. The finger tab 40 can be shifted vertically to close off the upper opening 28, much as the finger tab 35 closes off the lower opening 30 in varying degrees. Two finger grooves 45, 45 are formed in the base 46, and are positioned at opposite ends of the lower opening 30, as best shown in Figures 3, 4 and 5.

To use my invention, the operator first selects the slides which are to be viewed and places them one at a time in the storage and dispenser portion 13 through the upper opening 28, in the order in which it is proposed to examine side slides. When this has been done, the slides are arranged in a stack 47 in the lower portion 13, as indicated in dotted outline in Figures 1 and 3. The operator then adjusts the position of the finger tab 35 so that the clearance between the lower end of said tab 35 and the floor 29 is such that only one slide at a time can be removed from the housing 10 through the lower opening 30. The adjustability of the finger tab 35 is especially advantageous, since the slides may be of different thicknesses, depending on the type of slide binding or slide mounting frame which is used.

The finger grooves 45, 45, continuing the side opening 30 in front and back, enable the operator to clamp the two outer corners of the lowermost slide between two fingers, and thereby pull said slide through the lower opening 30. A similar arrangement is provided, and a similar operation is thus allowed, at the upper opening 15.

As each slide is removed at the bottom, it is inserted in the upper slotted opening 15. Light, which may be either external light or an electric bulb positioned over the translucent cover 17, casts a virtual image of the slide on the mirror 18, which is then viewed through the lens 20. Because of the inclined position of the lens 20, the film slides may be comfortably viewed by holding the viewer in the hand, or placing it on a desk or table before which the observer is seated. Thus it is unnecessary when using my invention to hold the viewer between the source of light and the eye, or to tilt the viewer to observe the film image. By hinging the lens 23 and its holder 24 on the pin 25, additional magnification of the slide may be obtained, to enable the operator to examine details of the slide. After each slide is examined, it can then be placed in a stack or, if desired, reinserted into the lower portion 13 through the opening 28. In either case, the slides are maintained in a predetermined order, for viewing in the desired sequence. Moreover, since only one slide at a time can be removed through the lower opening 30, the operator can automatically withdraw a slide and place it in the slotted opening 15 without even looking at the slide; yet be confident that the slides will be shown in the desired sequence.

Advantageously, the lower portion 13 of the housing 10 serves as a convenient storage compartment for a quantity of slides, and the housing 10 can be carried about turned upside down or on a side, without the slides dropping out of or becoming disarranged in the lower portion 13. This desirable feature is accomplished by moving the finger tab 35 down until it contacts the floor 29, and moving the finger tab 40 up along its groove 34 until it contacts the partition 11, thereby providing a closure for each of the openings 30 and 28. The washers 39 and 43 provide sufficient binding between the finger tabs 35 and 40 and the gate 27, to securely hold said tabs 35 and 40 in the closed position.

In practice I prefer that my combination film slide viewer and dispensing and storing magazine be molded from one of the many suitable thermo setting plastics. The lenses 20 and 23 and the cover 17 may be made of glass or plastic, while the finger tabs 35 and 40 and washers 39 and 43 may be inexpensively stamped or formed from metal.

Having thus fully disclosed my novel film slide viewer and integral dispensing and storage magazine, and demonstrated its utility by reference to a specific embodiment thereof, I claim as my invention:

1. A portable viewer for slides such as is adapted to be formed by plastic molding and which comprises a principal body for enclosing a rectangular space, an inclined mirror disposed in said space to reflect rays from a top direction of said body toward a front direction thereof, a front wall to said body having a viewing aperture, a lens over said aperture, the top of said body having a light projection aperture therein, said body including a peripheral frame surrounding and above the projection aperture, said frame having a pair of side approach channelways opening at the side of the viewer for the reception of a light diffusion slide, and a pair of side approach channelways opening at the side of the viewer for the reception of picture slides between the light diffusion slide and the light projecting aperture, the frame being narrower at the place of opening of the first channelway than the spacing between the second channelways so that a straight slide inserted in the second channelways projects beyond the frame at the first channelway to facilitate gripping of the slide for removal, the side of said frame opposite the one in which said second channelways open having a slide back stop to limit the extent of slide insertion thereby and to facilitate the rapid insertion and framing of picture slides for successive exposures.

2. The combination set forth in claim 1 in which said insertion limiting side wall includes a horizontally extending slot in registration with said intermediate level channelway for the reception of continuous multiple picture film strip therethrough alternatively to picture slides.

3. The combination set forth in claim 1 in which said peripheral frame comprises vertically conforming side wall elements and vertically offset front and rear wall elements, said offset corresponding to greater width in the picture slide receiving channelway in contrast with said diffusion slide channelway, and marginal portions of said front and rear wall elements at the slide insert side wall end being undercut to facilitate grasping of the picture slides for removal.

References Cited in the file of this patent

UNITED STATES PATENTS

| | | |
|---|---|---|
| 1,105,395 | Balmitgere | July 28, 1914 |
| 1,564,722 | Tauern et al. | Dec. 8, 1925 |
| 2,165,903 | Nuchterlein | July 11, 1939 |
| 2,211,376 | Isbell | Aug. 13, 1940 |
| 2,410,722 | Eckert | Nov. 5, 1946 |
| 2,520,432 | Robertson | Aug. 29, 1950 |
| 2,608,903 | Nemeth | Sept. 2, 1952 |
| 2,617,218 | Antos | Nov. 11, 1952 |

FOREIGN PATENTS

| | | |
|---|---|---|
| 93,280 | Austria | June 25, 1923 |